(12) United States Patent
Kim et al.

(10) Patent No.: US 10,979,878 B2
(45) Date of Patent: Apr. 13, 2021

(54) OPERATION METHOD OF COMMUNICATION NODE SUPPORTING NETWORK MANAGEMENT FUNCTIONS IN VEHICLE NETWORK

(71) Applicants: Hyundai Motor Company, Seoul (KR); Kia Motors Corporation, Seoul (KR)

(72) Inventors: Dong Ok Kim, Gyeonggi-do (KR); Jin Hwa Yun, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 288 days.

(21) Appl. No.: 15/879,752

(22) Filed: Jan. 25, 2018

(65) Prior Publication Data

US 2018/0279098 A1 Sep. 27, 2018

(30) Foreign Application Priority Data

Mar. 27, 2017 (KR) .................. 10-2017-0038627

(51) Int. Cl.
| | |
|---|---|
| G06F 15/16 | (2006.01) |
| H04W 4/48 | (2018.01) |
| H04L 12/40 | (2006.01) |
| H04L 12/24 | (2006.01) |
| H04L 29/08 | (2006.01) |
| H04L 12/44 | (2006.01) |

(52) U.S. Cl.
CPC ......... *H04W 4/48* (2018.02); *H04L 12/40039* (2013.01); *H04L 41/0246* (2013.01); *H04L 67/12* (2013.01); *H04L 2012/40215* (2013.01); *H04L 2012/40267* (2013.01); *H04L 2012/40273* (2013.01); *H04L 2012/445* (2013.01)

(58) Field of Classification Search
CPC ........................................................ H04W 4/48
See application file for complete search history.

(56) References Cited

U.S. PATENT DOCUMENTS

| | | | | |
|---|---|---|---|---|
| 2014/0081518 | A1* | 3/2014 | Son ................. | H04L 12/40 701/36 |
| 2015/0025704 | A1* | 1/2015 | Horihata .......... | H04L 12/40006 700/297 |

* cited by examiner

*Primary Examiner* — Kevin T Bates
*Assistant Examiner* — Clarence D McCray
(74) *Attorney, Agent, or Firm* — Mintz Levin Cohn Ferris Glovsky and Popeo, P.C.; Peter F. Corless

(57) ABSTRACT

An operation method of a communication node in a vehicle network may comprise performing a transition of an operation mode of the communication node from a sleep mode to a normal mode when a predetermined event is detected; transmitting a wake-up signal when the operation mode transitions from the sleep mode to the normal mode; generating a network management (NM) message including information indicating a wake-up reason corresponding to the wake-up signal; and transmitting the NM message.

18 Claims, 11 Drawing Sheets

OPERATION METHOD OF COMMUNICATION NODE SUPPORTING NETWORK MANAGEMENT FUNCTIONS IN VEHICLE NETWORK

CROSS-REFERENCE TO RELATED APPLICATION

This application claims the benefit of priority to Korean Patent Application No. 10-2017-0038627 filed on Mar. 27, 2017 in the Korean Intellectual Property Office (KIPO), the entirety of which is incorporated by reference as if fully set forth herein.

TECHNICAL FIELD

The present disclosure relates generally to a vehicle network technology, and more specifically, to an operation method of a communication node supporting network management (NM) functions in a vehicle network.

BACKGROUND

The number and variety of devices installed in vehicles have increased significantly in accordance with the recent digitalization of vehicle parts. Generally, electronic devices may be used throughout the vehicle, for example, a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via a vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

Most enhanced safety systems of a vehicle, such as telematics systems and infotainment systems, require higher transmission rates and system expandability. However, the CAN, FlexRay-based network, and the like may not sufficiently support such requirements. The MOST-based network, in particular, may support a higher transmission rate than the CAN or the FlexRay-based network. However, applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps.

The vehicle network described above may include a plurality of communication nodes (e.g., electronic devices), and a first communication node may transmit a wake-up signal to a second communication node when a specific event is detected. Upon receiving the wake-up signal, an operation mode of the second communication node may transition from a sleep mode to a normal mode. Thereafter, the second communication node may perform operations according to a wake-up reason if the second communication node is aware of the wake-up reason. However, the second communication node may not be aware of the wake-up reason even if it is woken up. As a result, appropriate operations in response to the wake-up reason may not be properly performed.

SUMMARY

The present disclosure provides an operation method of a communication node supporting network management (NM) functions in a vehicle network.

In accordance with embodiments of the present disclosure, an operation method of a communication node in a vehicle network includes: performing a transition of an operation mode of the communication node from a sleep mode to a normal mode when a predetermined event is detected; transmitting a wake-up signal when the operation mode transitions from the sleep mode to the normal mode; generating a network management (NM) message including information indicating a wake-up reason corresponding to the wake-up signal; and transmitting the NM message.

The NM message may further include information indicating a time period during which the communication node operates in the normal mode.

The NM message may be periodically transmitted during the time period, and a transmission period of the NM message is between 200 milliseconds and 500 milliseconds.

The NM message may further include information indicating an operation status of the communication node, the operation status may indicate at least one of a wake-up method and the operation mode of the communication node, the wake-up method may indicate an active wake-up or a passive wake-up, and the operation mode may indicate the sleep mode or the normal mode.

The NM message may include a first field indicating source information, a second field indicating network status information, and a third field indicating wake-up related information.

The third field may include a first sub-field indicating whether to set a time period during which the communication node operates in the normal mode, a second sub-field indicating a unit of the time period, a third sub-field indicating the time period, a fourth sub-field indicating an operation status of the communication node, and a fifth sub-field indicating the wake-up reason corresponding to the wake-up signal.

The NM message most recently transmitted from the communication node may further include information indicating that the communication node is transitioning to the sleep mode.

The NM message may be transmitted in a broadcast manner in the vehicle network.

Further, in accordance with embodiments of the present disclosure, an operation method of a first communication node in a vehicle network includes: receiving a wake-up signal from a second communication node included in the vehicle network; performing a transition of an operation mode of the first communication node from a sleep mode to a normal mode when the wake-up signal is received; receiving a network management (NM) message indicating a wake-up reason corresponding to the wake-up signal from the second communication node; and operating the first communication node based on information included in the NM message.

When the first communication node performs an operation according to the wake-up reason, the first communication node may operate in the normal mode during a time period indicated by the NM message.

The NM message may be periodically transmitted from the first communication node during the time period, and a transmission period of the NM message is between 200 milliseconds and 500 milliseconds.

When the first communication node does not perform an operation according to the wake-up reason, the operation mode of the first communication node may transition from the normal mode to the sleep mode.

The NM message may include a first field indicating source information, a second field indicating network status information, and a third field indicating wake-up related information.

The third field may include a first sub-field indicating whether to set a time period during which the first communication node operates in the normal mode, a second sub-field indicating a unit of the time period, a third sub-field indicating the time period, a fourth sub-field indicating an operation status of the communication node, and a fifth sub-field indicating the wake-up reason corresponding to the wake-up signal.

Further, in accordance with embodiments of the present disclosure, a communication node in a vehicle network may comprise a processor and a memory storing at least one instruction executed by the processor. when the at least one instruction is executed, the processor is caused to: perform a transition of an operation mode of the communication node from a sleep mode to a normal mode when a predetermined event is detected; transmit a wake-up signal when the operation mode transitions from the sleep mode to the normal mode; generate a network management (NM) message including information indicating a wake-up reason corresponding to the wake-up signal; and transmit the NM message.

The NM message may further include information indicating a time period during which the communication node operates in the normal mode.

The NM message may further include information indicating an operation status of the communication node, the operation status may indicate at least one of a wake-up method and the operation mode of the communication node, the wake-up method may indicate an active wake-up or a passive wake-up, and the operation mode may indicate the sleep mode or the normal mode.

The NM message may include a first field indicating source information, a second field indicating network status information, and a third field indicating wake-up related information.

The third field may include a first sub-field indicating whether to set a time period during which the first communication node operates in the normal mode, a second sub-field indicating a unit of the time period, a third sub-field indicating the time period, a fourth sub-field indicating an operation status of the communication node, and a fifth sub-field indicating the wake-up reason corresponding to the wake-up signal.

The NM message most recently transmitted from the communication node may further include information indicating that the communication node is transitioning to the sleep mode.

According to embodiments of the present disclosure, in the vehicle network, the first communication node can generate a network management (NM) message including information indicating a wake-up reason, and can transmit the generated NM message. Thus, the first communication node may use its NM function to inform other communication nodes of its wake-up reason. On the other hand, upon receiving the NM message, the second communication node can identify the wake-up reason based on the received NM message, and can operate based on the identified wake-up reason. Therefore, the wake-up reason can be shared among the communication nodes, so that malfunction of the communication nodes can be prevented. As a result, the performance of the vehicle network can be improved.

BRIEF DESCRIPTION OF DRAWINGS

Embodiments of the present disclosure will become more apparent by describing in detail forms of the present disclosure with reference to the accompanying drawings, in which.

Figure 1:
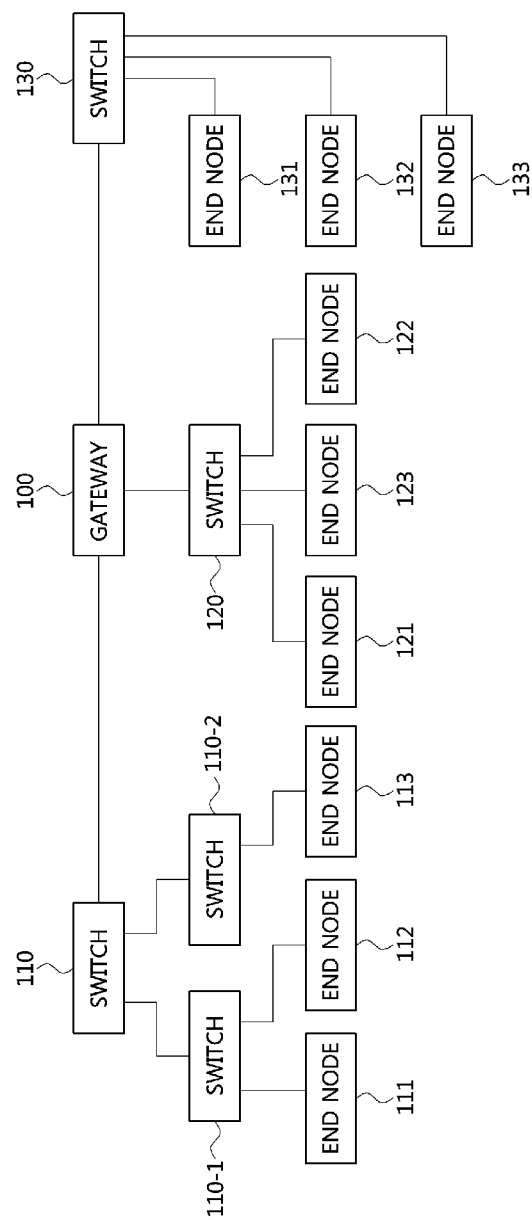
FIG. 1 is a block diagram illustrating a first embodiment of a vehicle network topology.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/control unit may perform one or more of the processes described further below, and the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a block diagram illustrating a first embodiment of a vehicle network topology.

As shown in FIG. 1, a communication node constituting a vehicle network may be a gateway, a switch (or bridge), or an end node. The gateway 100 may be connected with at least one switch 110, 110-1, 110-2, 120, and 130, and may be configured to connect different networks. For example, the gateway 100 may support connections between a switch which supports a controller area network (CAN) (or, FlexRay, media oriented system transport (MOST), or local interconnect network (LIN)) network) and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of the end nodes 111, 112, 113, 121, 122, 123, 131, 132, and 133 connected to the switch.

Each of the end nodes 111, 112, 113, 121, 122, 123, 131, 132, and 133 may include an electronic control unit (ECU) configured to control various types of devices mounted within a vehicle. For example, each of the end nodes 111, 112, 113, 121, 122, 123, 131, 132, and 133 may include an ECU included in an infotainment device (e.g., a display device, a navigation device, and an around view monitoring device).

Meanwhile, the communication nodes (i.e., gateways, switches, end nodes, etc.) constituting the vehicle network may be connected in a star topology, a bus topology, a ring topology, a tree topology, a mesh topology, or the like. Further, each of the communication nodes constituting the vehicle network may support the CAN protocol, the FlexRay protocol, the MOST protocol, the LIN protocol, the Ethernet protocol, or the like. A communication node belonging to the vehicle network may be configured as follows.

Figure 2:
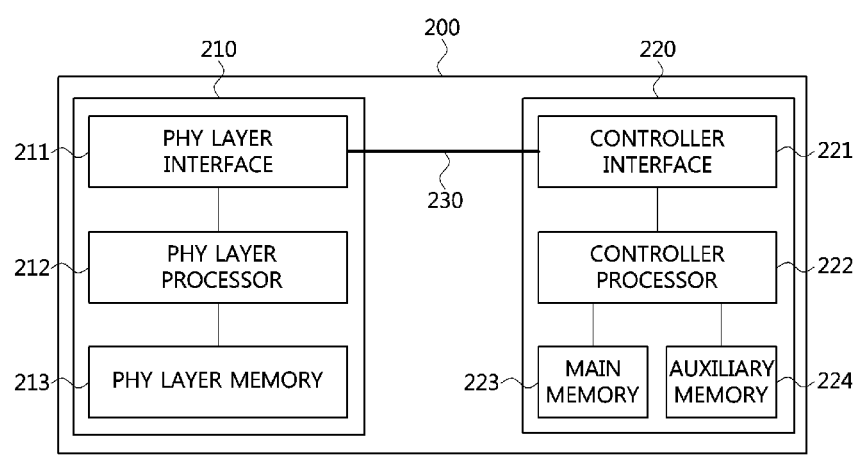
FIG. 2 is a block diagram illustrating a first embodiment of a communication node belonging to a vehicle network.

FIG. 2 is a block diagram illustrating a first embodiment of a communication node belonging to a vehicle network.

As shown in FIG. 2, a communication node 200 constituting a vehicle network illustrated in, e.g., FIG. 1, may include a physical (PHY) layer 210 and a controller 220. Also, the communication node 200 may further include a regulator (not shown) for supplying power. In particular, the controller 220 may be implemented to include a medium access control (MAC) layer. The PHY layer 210 may be configured to receive or transmit signals from or to another communication node. The controller 220 may be configured to control the PHY layer 210 and perform various functions (e.g., an infotainment function, or the like.). The PHY layer 210 and the controller 220 may be implemented as one system on chip (SoC), or alternatively may be implemented as separate chips.

The PHY layer 210 and the controller 220 may be connected via a media independent interface (MII) 230. The MII 230 may include an interface defined in the IEEE 802.3 and may include a data interface and a management interface between the PHY layer 210 and the controller 220. One of a reduced MII (RMII), a gigabit MII (GMII), a reduced GMII (RGMII), a serial GMII (SGMII), a 10 GMII (XGMII) may be used instead of the MII 230. The data interface may include a transmission channel and a reception channel, each of which may have independent clock, data, and control signal. The management interface may include a two-signal interface, one signal for the clock and one signal for the data.

The PHY layer 210 may include a PHY layer interface 211, a PHY layer processor 212, and a PHY layer memory 213. The configuration of the PHY layer 210 is not limited thereto, and the PHY layer 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to control operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller 220 may be configured to monitor and control the PHY layer 210 using the MII 230. The controller 220 may include a controller interface 221, a controller processor 222, a main memory 223, and an auxiliary memory 224. The controller processor 222 is an electric circuitry which performs various functions described below. The configuration of the controller 220 is not limited thereto, and the controller 220 may be configured in various ways. The controller interface 221 may be configured to receive a signal from the PHY layer 210 (e.g., the PHY layer interface 211) or an upper layer (not shown), transmit the received signal to the controller processor 222, and transmit the signal received from the controller processor 222 to the PHY layer 210 or the upper layer. The controller processor 222 may further include independent memory control logic or integrated memory control logic for controlling the controller interface 221, the main memory 223, and the auxiliary memory 224. The memory control logic may be implemented to be included in the main memory 223 and the auxiliary memory 224 or may be implemented to be included in the controller processor 222.

Each of the main memory 223 and the auxiliary memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The auxiliary memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

Meanwhile, the communication node 200 may include only the controller 220, and the PHY layer 210 may be located outside the communication node 200. For example, the communication node 200 may be configured as follows.

Figure 3:
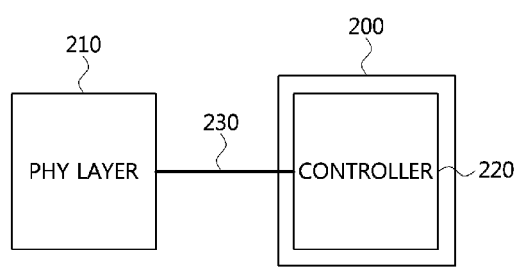
FIG. 3 is a block diagram illustrating a second embodiment of a communication node belonging to a vehicle network.

FIG. 3 is a block diagram illustrating a second embodiment of a communication node belonging to a vehicle network.

As shown in FIG. 3, the communication node 200 may include the controller 220 and may further include a regulator (not shown) for supplying power. The controller 220 may be connected to the PHY layer 210 located outside the communication node 200 and may control the PHY layer 210. Functions of the PHY layer 210 and the controller 220 shown in FIG. 3 may be the same as or similar to those of the PHY layer 210 and the controller 220 shown in FIG. 2.

The PHY layer 210 may be connected to the controller 220 via a media independent interface (MII) 230. The MII 230 may refer to an interface defined in IEEE 802.3, and may be configured as a data interface and a management interface between the PHY layer 210 and the controller 220. One of RMII, GMII, RGMII, SGMII, and XGMII may be used instead of the MII 230. The data interface may include a transmit channel and a receive channel, each of which may have independent clock, data, and control signals. The management interface may be configured as a two-signal interface, one for the clock and the other for the data.

Meanwhile, a protocol structure of the communication node shown in FIG. 1 to FIG. 3 may be as follows.

Figure 4:
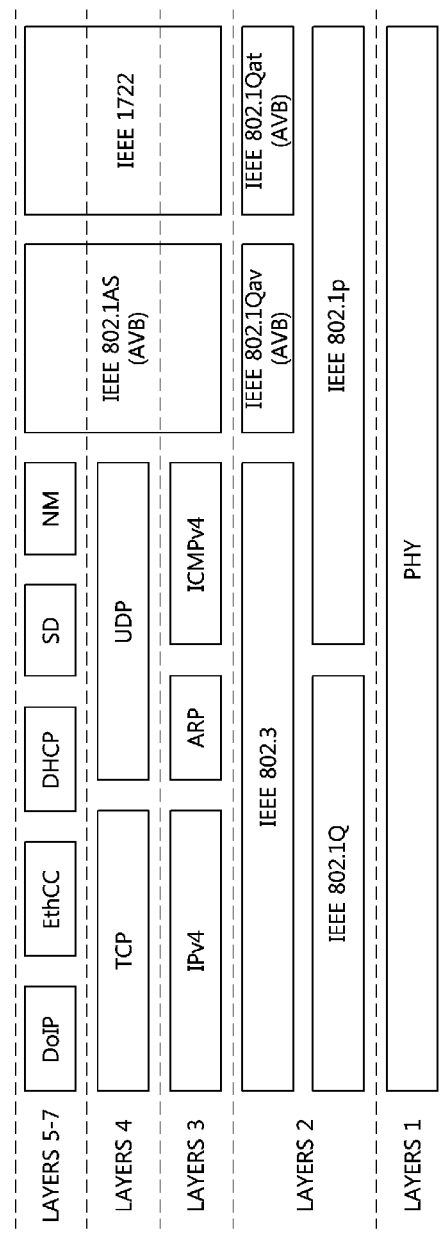
FIG. 4 is a block diagram illustrating a first embodiment of a protocol structure of a communication node constituting a vehicle network.

FIG. 4 is a block diagram illustrating a first embodiment of a protocol structure of a communication node constituting a vehicle network.

As shown in FIG. 4, a communication node may comprise layer 1 through layer 7. The layer 1 of the communication node may support the PHY functions and support a transmission rate of 100 megabits per second (Mbps). The layer 2 of the communication node may support IEEE 802.1Q protocol, IEEE 802.1p protocol, IEEE 802.3 protocol, audio video bridging (AVB) protocol (e.g., IEEE 802.1Qav protocol, IEEE 802.1Qat protocol), and the like. The layer 3 of the communication node may support internet protocol version 4 (IPv4), address resolution protocol (ARP), internet control message protocol version 4 (ICMPv4), IEEE 802.1AS, IEEE 1722, and the like. The layer 4 of the communication node may support transfer control protocol (TCP), user datagram protocol (UDP), IEEE 802.1AS, IEEE 1722, and the like. The layers 5 through 7 of the communication node may support diagnostics over internet protocol (DoIP), EthCC protocol, dynamic host configuration protocol (DHCP), SD protocol, network management (NM) protocol, IEEE 802.1AS, IEEE 1722, and the like.

The communication node described above may operate in a sleep mode or a normal mode. In the sleep mode, the PHY layer of the communication node may be in an enabled state, and the controller of the communication node may be in a disabled state. Alternatively, in the sleep mode, the PHY layer and the controller of the communication node may be in the disabled state. In the normal mode, the PHY layer and the controller of the communication node may be enabled. That is, the normal mode may indicate a state in which the communication node has waked up. When a wake-up signal is received or when a specific event is detected, the operating mode of the communication node may transition from the sleep mode to the normal mode. In this case, a system booting procedure of the communication node may be performed as follows.

Figure 5:
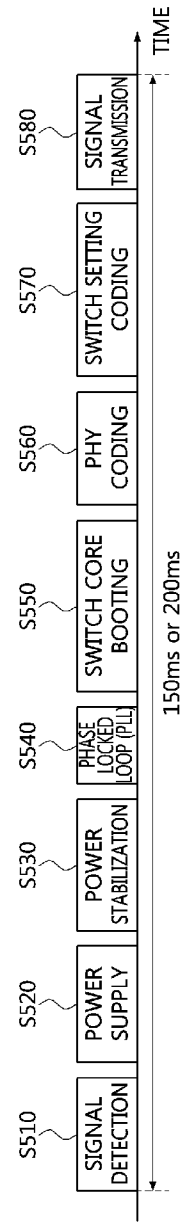
FIG. 5 is a conceptual diagram for explaining a first embodiment of a system booting procedure performed at a communication node.

FIG. 5 is a conceptual diagram for explaining a first embodiment of a system booting procedure performed at a communication node;

As shown in FIG. 5, the system booting procedure may be performed at a switch (or, an end node or a gateway), and may include a signal detection step S510, a power supply step S520, a power stabilization step S530, a phase locked loop (PLL) step S540, a switch core booting step S550, a PHY coding step S560, a switch setting coding step S570, a signal transmission step S580, and the like. For example, in the step S510, when a wake-up signal is received from another communication node (e.g., an end node) or when a specific event is detected, power may be supplied to the switch, and the controller (e.g., core) of the switch may be enabled. Thereafter, the switch may transmit signals over the PHY link after performing a coding procedure (e.g., the steps S550, S560, and S570).

The system booting procedure described above may be completed within a maximum of 150 milliseconds when the switch (or, an end node or a gateway) is the communication node shown in FIG. 2 (i.e., the case that the PHY layer is located inside the switch). On the other hand, the system booting procedure may be completed within a maximum of 200 ms when the switch (or, an end node or a gateway) is the communication node shown in FIG. 3 (i.e., the case that the PHY layer is located outside the switch).

Hereinafter, the operation methods of the communication node supporting the NM functions in the vehicle network will be described. Hereinafter, even when a method (e.g., transmission or reception of a signal) to be performed at the first communication node is described, the corresponding second communication node may perform a method (e.g., reception or transmission of the signal) corresponding to the method performed at the first communication node. That is, when the operation of the first communication node is described, the corresponding second communication node may perform an operation corresponding to the operation of the first communication node. Conversely, when the operation of the second communication node is described, the corresponding first communication node may perform an operation corresponding to the operation of the second communication node.

Figure 6:
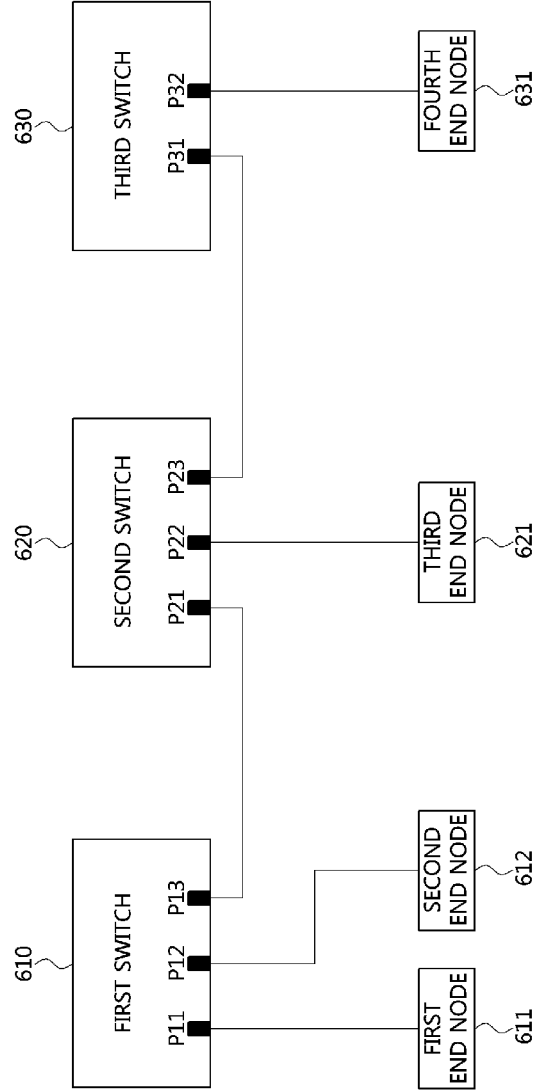
FIG. 6 is a block diagram illustrating a second embodiment of a vehicle network topology.
Figure 7:
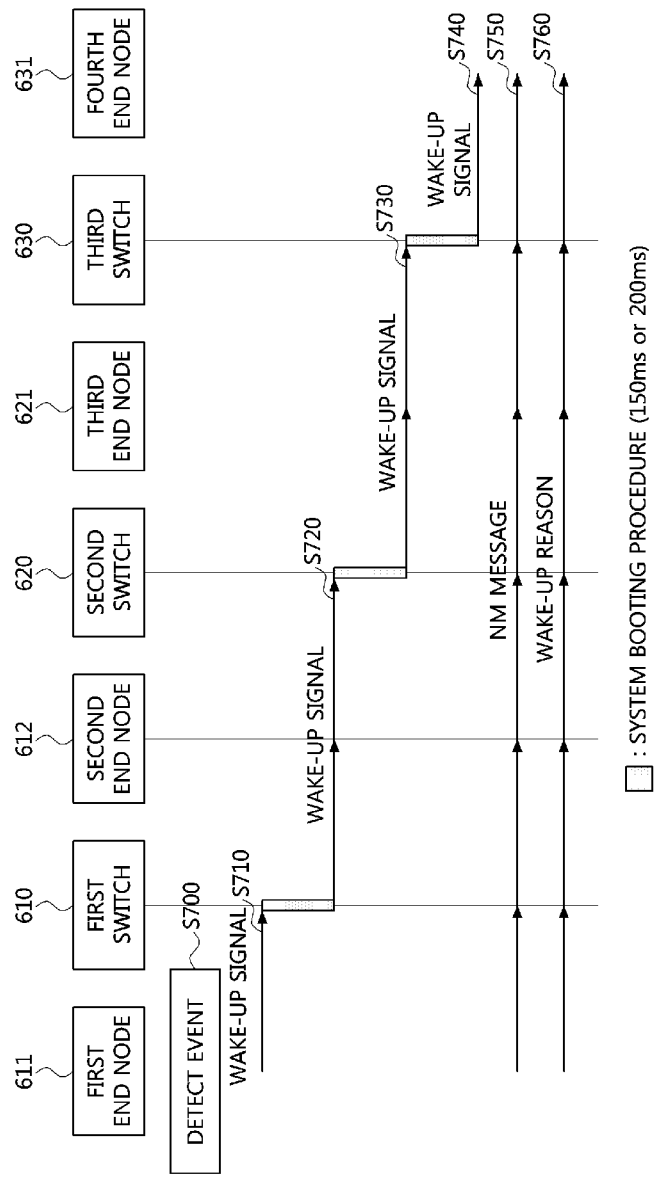
FIG. 7 is a flowchart for explaining a first embodiment of an operation method of a communication node in the vehicle network shown in FIG. 6.

FIG. 6 is a block diagram illustrating a second embodiment of a vehicle network topology, and FIG. 7 is a flowchart for explaining a first embodiment of an operation method of a communication node in the vehicle network shown in FIG. 6.

As shown in FIGS. 6 and 7, a vehicle network may include a first switch 610, a second switch 620, a third switch 630, a first end node 611, a second end node 612, a third end node 621, a fourth end node 631, and the like. The switches 610, 620 and 630 may perform the same or similar functions as the switches shown in FIG. 1, and the end nodes 611, 612, 621 and 631 may perform the same or similar functions as the end node shown in FIG. 1. Each of the switches 610, 620, and 630 and the end nodes 611, 612, 621, and 631 may be configured to be the same as or similar to the communication node shown in FIGS. 2 to 4.

The first switch 610 may be connected to the first end node 611 via a port P11, connected to the second end node 612 via a port P12, and connected to the second switch 620 via a port P31. The communications between the first switch 610 and the switch 620 may be performed using one interface among MII, RMII, GMII, RGMII, SGMII, and XGMII. The second switch 620 may be connected to the first switch 610 via a port P21, connected to the third end node 621 via a port P22, and connected to the third switch 630 via a port P23. The communications between the second switch 620 and the third switch 630 may also be performed using one interface among MII, RMII, GMII, RGMII, SGMII, and XGMII. The third switch 630 may be connected to the second switch 620 through a port P31 and connected to the fourth end node 631 through a port P32.

Meanwhile, the first end node 611 may operate in the sleep mode and may detect an event (e.g., a local event) (S700). If an event is detected, the first end node 611 may perform a system booting procedure (e.g., the system booting procedure illustrated in FIG. 5, or a system booting procedure based on the CAN protocol or a general-purpose input/output (GPIO)). Accordingly, the operation mode of the first end node 611 may transition from the sleep mode to the normal mode. That is, the first end node 611 may be woken up. Thereafter, the first end node 611 may transmit a wake-up signal (S710). For example, the first end node 611 may identify a wake-up reason (e.g., an occurrence reason of the event). If the first end node 611 determines that it is necessary to wake up another communication node according to the wake-up reason, the first end node 611 may transmit the wake-up signal. Alternatively, the first end node 611 may simultaneously perform the system booting procedure and the wake-up signal transmission procedure. The wake-up signal may be transmitted in a broadcast manner.

Also, the first end node 611 may transmit a message indicating the wake-up reason (e.g., the occurrence reason of the event). However, in case that the message indicating the wake-up reason is transmitted before another communication node (e.g., the first switch 610, the second switch 620, the third switch 630, the second end node 612, or the third end node 621) is woken up, the message indicating the wake-up reason may not be received at the another communication node, and thus the another communication node may not know why itself is woken up. Thus, the message indicating the wake-up reason may be transmitted after all of the communication nodes constituting the vehicle network have been woken up. That is, a transmission time point of the message indicating the wake-up reason may be determined based on the configuration of the vehicle network. The wake-up reason represents a reason for waking the communication node. For example, wake-up reason may be, but is not limited to:

Door operation (e.g., door open, door closed);
Telematics operation (e.g., remote start);
Media operation;
Power mode transition of the vehicle (e.g., ACC, IGN); and
Detection of theft.

The first switch 610 may receive the wake-up signal from the first end node 611 via the port P11, and may perform a system booting procedure (i.e., the system booting procedure illustrated in FIG. 5) based on the wake-up signal. A time up to 150 ms or 200 ms may be required to perform the system booting procedure. Thereafter, the first switch 610 may also transmit a wake-up signal (S720). The wake-up signal may be transmitted in a broadcast manner. For example, the wake-up signal may be transmitted through the port P12 and port P13 of the first switch 610.

The second end node 612 may receive the wake-up signal from the first switch 610, and may perform a system booting procedure (i.e., the system boot procedure illustrated in FIG. 5) based on the wake-up signal. The second switch 620 may receive the wake-up signal from the first switch 610 via the port P21, and may perform a system booting procedure (i.e., the system booting procedure illustrated in FIG. 5) based on the wake-up signal. A time up to 150 ms or 200 ms may be required to perform the system booting procedure. Thereafter, the second switch 620 may also transmit a wake-up signal (S730). The wake-up signal may be transmitted in a broadcast manner. For example, the wake-up signal may be transmitted through the port P22 and port P23 of the second switch 620.

The third end node 621 may receive the wake-up signal from the second switch 620, and may perform a system booting procedure (i.e., the system boot procedure illustrated in FIG. 5) based on the wake-up signal. The third switch 630 may receive the wake-up signal from the second switch 620 via the port P31, and may perform a system booting procedure (i.e., the system booting procedure illustrated in FIG. 5) based on the wake-up signal. A time up to 150 ms or 200 ms may be required to perform the system booting procedure. Thereafter, the third switch 630 may also transmit a wake-up signal (S740). The wake-up signal may be transmitted in a broadcast manner. For example, the wake-up signal may be transmitted through the port P32 of the third switch 630. The fourth end node 631 may receive the wake-up signal from the third switch 630, and may perform a system booting procedure (i.e., the system booting procedure illustrated in FIG. 5) based on the wake-up signal.

Meanwhile, the first end node 611 which has been woken up may generate an NM message and transmit the NM message in a broadcast manner (S750). The NM message may be configured as follows.

Figure 8:
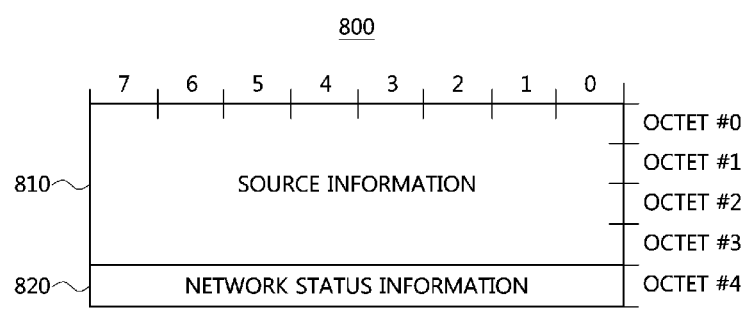
FIG. 8 is a block diagram illustrating a first embodiment of an NM message.

FIG. 8 is a block diagram illustrating a first embodiment of an NM message.

As shown in FIG. 8, an NM message 800 may include a source information field 810 and a network status information field 820. The source information field 810 may include an identifier (e.g., an address) of a source communication node and may have a size of 4 octets. The network status information field 820 may indicate a network status of the communication node that transmitted the NM message 800 and may have a size of 1 octet.

Referring again to FIGS. 6 and 7, the source information field of the NM message transmitted in the step S750 may indicate the identifier of the first end node 611, and the network status information field of the NM message transmitted in the step S750 may indicate the network status of the first end node 611. In the vehicle network, the first switch 610, the second switch 620, the third switch 630, the second end node 612, the third end node 621, and the fourth end node 631 may confirm the network status of the first end node 611 based on the received NM message.

Also, the first end node 611 may generate a message indicating the wake-up reason and may transmit the message (S760). Since the message is transmitted in a broadcast manner, the first switch 610, the second switch 620, the third switch 630, the second end node 612, the third end node 621, and the fourth end node 631 may receive the message indicating the wake-up reason of the first end node 611, and confirm the wake-up reason based on the received message. For example, when the wake-up reason indicates 'door open' and the second end node 612 has a function to be performed for the door open event, the second end node 612 may maintain the normal mode, and perform the function according to the door open event. On the other hand, when the wake-up reason indicates 'door open' and the fourth end node 631 does not have a function to be performed for the door open event, the operation mode of the fourth end node 631 may be transited from the normal mode to the sleep mode again.

Since the message indicating the wake-up reason is required to be transmitted after all the communication nodes constituting the vehicle network have been woken up, the transmission time point of the message indicating the wake-up reason may vary according to the configuration of the vehicle network. Since the vehicle network can be configured in a variety of ways, it may not be easy to determine when to transmit the message indicating the wake-up reason.

Hereinafter, a method of transmitting and receiving the message indicating the wake-up reason in the vehicle network will be described.

Figure 9:
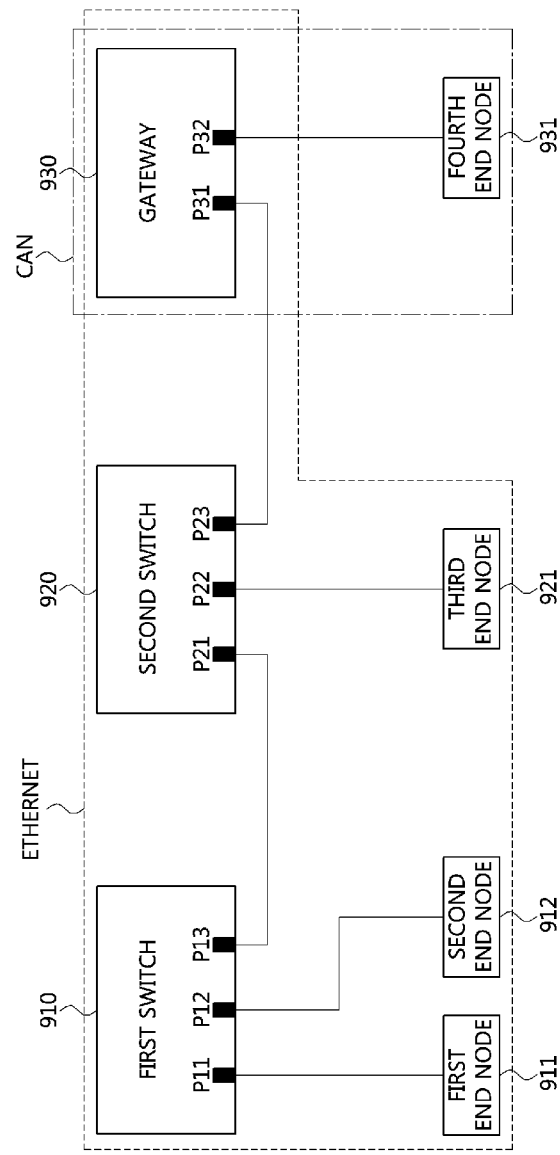
FIG. 9 is a block diagram illustrating a third embodiment of a vehicle network topology.
Figure 10:
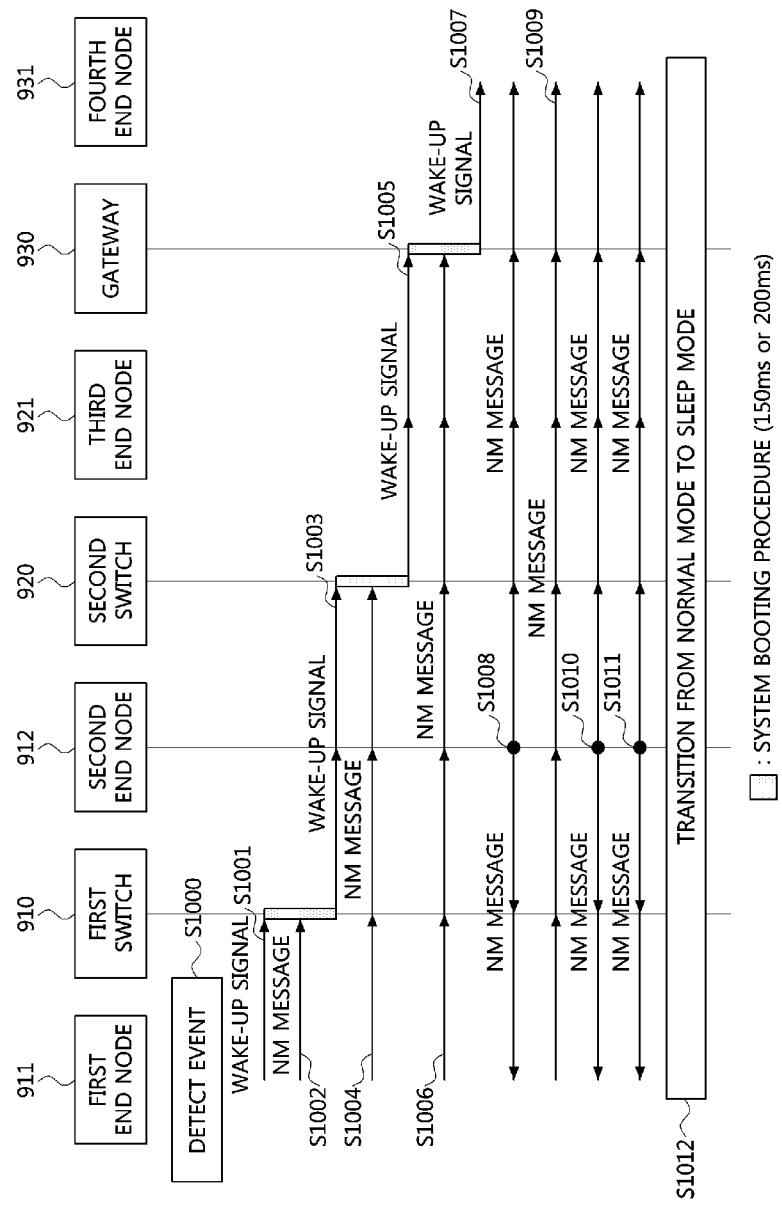
FIG. 10 is a flowchart for explaining a first embodiment of an operation method of a communication node in the vehicle network shown in FIG. 9.

FIG. 9 is a block diagram illustrating a third embodiment of a vehicle network topology, and FIG. 10 is a flowchart for explaining a first embodiment of an operation method of a communication node in the vehicle network shown in FIG. 9.

As shown in FIGS. 9 and 10, a vehicle network may include a first switch 910, a second switch 920, a gateway 930, a first end node 911, a second end node 912, a third end node 921, a fourth end node 931, and the like. The vehicle network may be formed as having a first vehicle network supporting the Ethernet protocol and a second vehicle network supporting the CAN protocol. The first vehicle network may include the first switch 910, the second switch 920, the gateway 930, the first end node 911, the second end node 912, and the third end node 921. The second vehicle network may include the gateway 930 and the fourth end node 931. Here, the gateway 930 may support communications between the first vehicle network and the second vehicle network.

The switches 910 and 920 may perform the same or similar functions as the switches shown in FIG. 1 and the gateway 930 may perform the same or similar functions as the gateway shown in FIG. 1. Also, the nodes 911, 912, 921, and 931 may perform the same or similar functions as the end node shown in FIG. 1. Each of the switches 910 and 920, the gateway 930, and the end nodes 911, 912, 921 and 931 may be configured to be the same as or similar to the communication nodes shown in FIGS. 2 to 4.

The first switch 910 may be connected to the first end node 911 via a port P11, connected to the second end node 912 via a port P12, and connected to the second switch 920 via a port P13. The communications between the first switch 910 and the second switch 920 may be performed using one interface among MII, RMII, GMII, RGMII, SGMII, and XGMII. The second switch 920 may be connected to the first switch 910 via a port P21, connected to the third end node 921 via a port P22, and connected to the gateway 930 via a port P23. The communications between the second switch 920 and the gateway 930 may be performed using one interface among MII, RMII, GMII, RGMII, SGMII, and XGMII. The gateway 930 may be connected to the second switch 920 via a port P31 and may be connected to the fourth end node 931 via a port P32.

Meanwhile, the first end node 911 may operate in the sleep mode and may detect an event (e.g., a local event) (S1000). If an event is detected, the first end node 911 may perform a system booting procedure (e.g., the system booting procedure illustrated in FIG. 5, or the system booting procedure based on the CAN protocol or a general-purpose input/output (GPIO)). Accordingly, the operation mode of the first end node 911 may transition from the sleep mode to the normal mode. That is, the first end node 911 may be woken up. Thereafter, the first end node 911 may transmit a wake-up signal (S1001). For example, the first end node 911 may identify a wake-up reason (e.g., an occurrence reason of the event). If the first end node 911 determines that it is necessary to wake up another communication node according to the wake-up reason, the first end node 911 may transmit the wake-up signal. Alternatively, the first end node 911 may simultaneously perform the system booting procedure and the wake-up signal transmission procedure. The wake-up signal may be transmitted in a broadcast manner. Also, the first end node 911 may generate an NM message indicating the wake-up reason. The NM message may be configured as follows.

Figure 11:
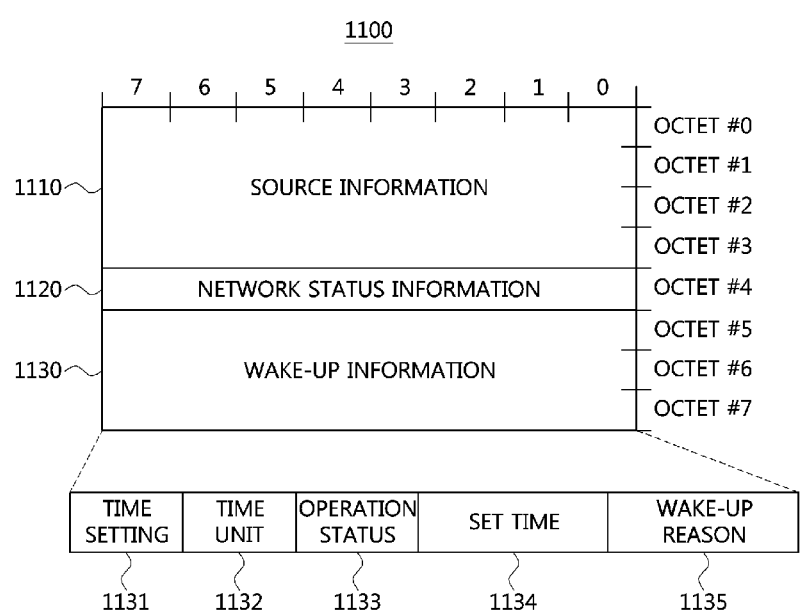
FIG. 11 is a block diagram illustrating a second embodiment of an NM message.

FIG. 11 is a block diagram illustrating a second embodiment of an NM message.

As shown in FIG. 11, an NM message 1100 may include a source information field 1110, a network status information field 1120, and a wake-up information filed 1130. The source information field 1110 may include an identifier (e.g., an address) of a source communication node and may have a size of 4 octets. The network status information field 1120 may indicate a network status of the communication node that transmitted the NM message 800 and may have a size of 1 octet. The wake-up information field 1130 may have a size of 3 octets and include a time setting field 1131, a time unit field 1132, an operation status field 1133, a set time field 1134, and a wake-up reason field 1135.

The time setting field 1131 may have a size of 2 bits and indicate whether the corresponding NM message 1100 includes information on a time period during which the communication node that transmitted the NM message 800 operates in the normal mode (e.g., a time required for performing an operation according to the wake-up reason). The time setting field 1131 may be configured based on Table 1 below.

TABLE 1

| Time setting field | Description |
|---|---|
| 00 | Initial |
| 01 | Enabled |
| 10 | Disabled |
| 11 | Reserved |

For example, the time setting field 1131 set to '01' may indicate that the corresponding NM message 1100 includes the information on the time period. The time setting field 1131 set to '10' may indicate that the corresponding NM message 1100 does not include the information on the time period.

The time unit field 1132 may have a size of 3 bits and may indicate a unit of the time period indicated by the corresponding NM message 1100. The time unit field 1132 may be configured based on Table 2 below.

TABLE 2

| Time unit field | Description |
|---|---|
| 000 | Millisecond |
| 001 | Second |
| 010 | Minute |
| 011 | Hour |
| 100~111 | Reserved |

For example, the time unit field 1132 set to '000' may indicate 'millisecond (ms)', the time unit field 1132 set to '001' may indicate 'second (s)', the time unit field 1132 set to '010' may indicate 'minute', and the time unit field 1132 set to '011' may indicate 'hour'.

The operation status field 1133 may have the size of 3 bits and indicate an operation status of the communication node that transmitted the corresponding NM message 1100. The operation status field 1133 may be configured based on Table 3 below.

TABLE 3

| Operation status field | Description |
|---|---|
| 000 | Normal mode/Active wake-up |
| 001 | Normal mode/Passive wake-up |
| 010 | Initial |
| 011 | Sleep mode |
| 100~111 | Reserved |

For example, the operation status field 1133 set to '000' may indicate that the communication node that transmitted the corresponding NM message 1100 is operating in the normal mode by being actively woken up. The operation status field 1133 set to '001' may indicate that the communication node that transmitted the corresponding NM message 1100 is operating in the normal mode by being passively woken up. Here, the active wake-up may indicate that the communication node is woken up by detecting an event, and the passive wake-up may indicate that the communication node is being woken up by receiving a wake-up signal from another communication node. The operation status field 1133 set to '011' may indicate that the communication node that transmitted the corresponding NM message 1100 is to operate in the sleep mode (i.e., to transit to the sleep mode).

The set time field 1134 may indicate a size of 8 bits and indicate the time period during which the communication node that transmitted the NM message 800 operates in the normal mode (e.g., a time required for performing an operation according to the wake-up reason). The set time field 1134 may be configured based on Table 4 below.

TABLE 4

| Set time field | Description |
|---|---|
| 00000000~00111011 | Time period during which the communication node operates in the normal mode |
| 00111100~11111111 | Reserved |

The wake-up reason field 1135 may have a size of 8 bits and may indicate the reason why the communication node that received the corresponding NM message 1100 is woken up. The wake-up reason field 1135 may be configured based on Table 5 below.

TABLE 5

| Wake-up reason field | Description |
| --- | --- |
| 00000000 | Door operation (e.g., door open, door closed) |
| 00000001 | Telematics operation (e.g., remote start) |
| 00000010 | Media operation |
| 00000011 | Power mode transition (e.g., ACC, IGN) |
| 00000100 | Detection of theft |
| 00000101~11111111 | Reserved |

For example, the wake-up reason field 1135 set to '00000000' indicates that the communication node receiving the corresponding NM message 1100 has been woken up by the occurrence of a door operation event (e.g., door open or door closed). The wake-up reason field 1135 set to '00000001' may indicate that the communication node receiving the corresponding NM message 1100 has been woken up by the occurrence of a remote start event. The wake-up reason field 1135 set to '00000010' may indicate that the communication node receiving the corresponding NM message 1100 has been woken up by the occurrence of a media operation event. The wake-up reason field 1135 set to '00000011' may indicate that the communication node receiving the corresponding NM message 1100 has been woken up by the occurrence of a power mode transition event. The wake-up reason field 1135 set to '00000100' may indicate that the communication node receiving the corresponding NM message 1100 has been woken up by the occurrence of a theft detection event.

Referring again to FIGS. 9 and 10, the wake-up information field of the NM message generated by the first end node 911 may be configured based on Table 6 below.

TABLE 6

| Field | Value | Description |
| --- | --- | --- |
| Time setting field | 01 | Enable |
| Time unit field | 001 | Second |
| Operation status field | 000 | Normal/Active wake-up |
| Set time field | 0011110011 | 60 |
| Wake-up reason field | 00000001 | Remote start event |

The first end node 911 may transmit an NM message in a broadcast manner (S1002). However, since the first switch 910, the second switch 920, the gateway 930, the second end node 912, the third end node 921, and the fourth end node 931 may be in the sleep mode in the step S1002, they may not receive the NM message from the first end node 911. Meanwhile, the first switch 910 may receive the wake-up signal from the first end node 911 via the port P11, and may perform a system booting procedure (i.e., the system booting procedure illustrated in FIG. 5) by operating in the normal mode. A time up to 150 ms or 200 ms may be required to perform the system booting procedure. Thereafter, the first switch 910 may transmit a wake-up signal (S1003). The wake-up signal may be transmitted in a broadcast manner. For example, the wake-up signal may be transmitted through the ports P12 and port P13 of the first switch 910.

The second end node 912 may receive the wake-up signal from the first switch 910, and may perform a system booting procedure (i.e., the system booting procedure illustrated in FIG. 5) based on the wake-up signal by operating in the normal mode. The second switch 920 may receive a wake-up signal from the first switch 910 via the port P21, and may perform a system booting procedure (i.e., the system booting procedure illustrated in FIG. 5) based on the wake-up signal by operating in the normal mode. A time up to 150 ms or 200 ms may be required to perform the system booting procedure. Thereafter, the second switch 920 may transmit a wake-up signal (S1005). The wake-up signal may be transmitted in a broadcast manner. For example, the wake-up signal may be transmitted through the ports P22 and port P23 of the second switch 920.

The third end node 921 may receive the wake-up signal from the second switch 920, and may perform a system booting procedure (i.e., the system booting procedure illustrated in FIG. 5) based on the wake-up signal by operating in the normal mode. The gateway 930 may receive a wake-up signal from the second switch 920 via the port P31, and may perform a system booting procedure (i.e., the system booting procedure illustrated in FIG. 5) based on the wake-up signal by operating in the normal mode. A time up to 150 ms or 200 ms may be required to perform the system booting procedure. Thereafter, the gateway 930 may transmit a wake-up signal (S1007). The wake-up signal may be transmitted in a broadcast manner. For example, the wake-up signal may be transmitted through the port P32 of the gateway 930. The fourth end node 931 may receive the wake-up signal from the gateway 930, and may perform a system booting procedure (i.e., the system booting procedure illustrated in FIG. 5) based on the wake-up signal by operating in the normal mode.

Meanwhile, the first end node 911 may periodically transmit the NM message in a broadcast manner after performing the step S1002 (e.g., S1004, S1006, and S1009). The transmission period of the NM message may be 200 ms to 500 ms. Also, since the first end node 911 may operate in the normal mode during the time period indicated by the set time field included in the NM message, the NM message may also be transmitted during the time period indicated by the set time field, and the operation status field of the NM message transmitted most recently (i.e., the last NM message) from the first end node 911 (e.g., the NM message transmitted in the step S1009) may be set to '011'.

Since the first switch 910 and the second end node 912 operate in the normal mode in the step S1004, they may receive the NM message of the first end node 911. On the other hand, since the second switch 920, the gateway 930, the third end node 921, and the fourth end node 931 are still in the sleep mode in the step S1004, they may not receive the NM message of the first end node 911. Since the first switch 910, the second switch 920, the second end node 912, and the third end node 921 operate in the normal mode in the step S1006, they may receive the NM message of the first end node 911. On the other hand, since the gateway 930 and the fourth end node 931 are still in the sleep mode in the step S1006, they may not receive the NM message of the first end node 911. Since the first switch 910, the second switch 920, the gateway 930, the second end node 912, the third end node 921, and the fourth end node 931 operate in the normal mode in the step S1009, they may receive the NM message of the first end node 911.

The first switch 910 may receive the NM message from the first end node 911 after being woken up. For example, in the steps S1004, S1006, and S1009, the first switch 910 may receive the NM message from the first end node 911. The first switch 910 receiving the NM message may operate as follows.

Figure 12:
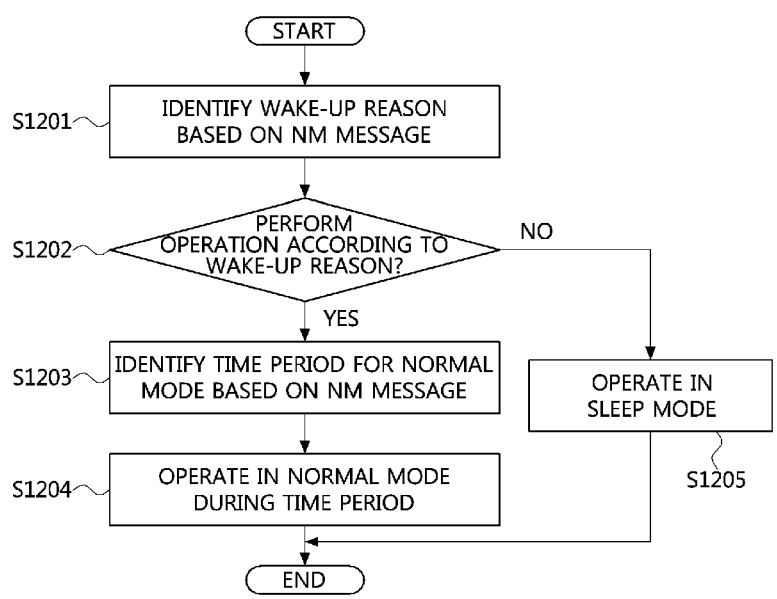
FIG. 12 is a flowchart for explaining a second embodiment of an operation method of a communication node in the vehicle network shown in FIG. 9.

FIG. 12 is a flowchart for explaining a second embodiment of an operation method of a communication node in the vehicle network shown in FIG. 9.

As shown in FIG. 12, the first switch 910 may identify a wake-up reason based on a wake-up reason field (e.g., the wake-up information field of the NM message in Table 6) included in the NM message received from the first end node 911 (S1201). For example, when the wake-up reason field indicates '00000001', the first switch 910 may determine that the first switch 910 has been woken up by the occurrence of the remote start event. Thereafter, the first switch 910 may determine whether the first switch 910 (or, a communication node connected to the first switch 910) performs an operation according to the wake-up reason (S1202). If the first switch 910 (or, a communication node connected to the first switch 910) does not perform an operation according to the wake-up reason, the first switch 910 may transition to the sleep mode (S1205). That is, the operation mode of the first switch 910 may transition from the normal mode to the sleep mode. Here, the step S1202 may be omitted, in which case the first switch 910 may perform step S1203 and S1204 irrespective of the identified wake-up reason.

In case that the first switch 910 (or, a communication node connected to the first switch 910) performs an operation according to the wake-up reason, the first switch 910 may identify the time period during which the first switch 910 operates in the normal mode based on the time setting field, the time unit field, and the set time field (e.g., the wake-up information field of the NM message in Table 6) included in the NM message received from the first end node 911 (S1203). Based on Table 6 (above), it may be confirmed that the first switch 910 operates in the normal mode for 60 seconds. Also, the first switch 910 may identify that the first end node 911 operates in the normal mode by being actively woken up based on the operation status field (e.g., the wake-up information filed of the NM message in Table 6) included in the NM message received from the first end node 911.

The first switch 910 may operate in the normal mode for the time period (e.g., 60 seconds) indicated by the NM message (S1204). For example, the first switch 910 may operate in the normal mode for the time period (e.g., 60 seconds) indicated by the NM message from the point at which the first switch 910 is woken up. In this case, the first switch 910 may support the execution of the remote start operation, which is the wake-up reason, and may transmit an NM message in a broadcast manner. Also, the NM message may be periodically transmitted, and the transmission period of the NM message may be 200 ms to 500 ms. Therefore, the communication nodes (e.g., the second end node 912, the second switch 920, the third end node 921, the gateway 930, and the fourth end node 931) may receive the NM message of the first end node 911, and may operate based on the information included in the received NM message. For example, the second end node 912, the second switch 920, the third end node 921, the gateway 930, and the fourth end node 931 may operate in the same or similar manner as the first switch 910 described with reference to FIG. 12.

Referring again to FIGS. 9 and 10, the second end node 912 may be woken up based on the wake-up signal received from the first switch 910, may receive the NM message from the first end node 911 after being woken up, and may operate according to the information included in the received NM message. For example, when the NM message is received, the second end node 912 may perform the steps S1201 to S1205 shown in FIG. 12.

Also, the second end node 912 may generate an NM message based on the detected event when the event is detected. The wake-up information field of the NM message generated by the second end node 912 may be configured based on Table 7 below. Here, the operation status field may be set to '001' instead of '000'.

TABLE 7

| Field | Value | Description |
| --- | --- | --- |
| Time setting field | 01 | Enable |
| Time unit field | 001 | Second |
| Operation status field | 000 | Normal/Active wake-up |
| Set time field | 00011101 | 30 |
| Wake-up reason field | 00000000 | Door open |

The second end node 912 may transmit the NM message (S1008, S1010, and S1011). The NM message of the second end node 912 may be transmitted in a broadcast manner, and thus the communication nodes (e.g., the first switch 910, the second switch 920, the gateway 930, the first end node 911, the third end node 921, and the fourth end node 931) may receive the NM message of the second end node 912. Also, the NM message of the second end node 912 may be periodically transmitted. The transmission period of the NM message of the second end node 912 may be 200 ms to 500 ms. Also, since the second end node 912 operates in the normal mode during the time period indicated by the set time field included in the received NM message, the NM message may be transmitted during the time period indicated by the set time field, and the operation status field of the NM message most recently transmitted (i.e., the last NM message) from the second end node 912 (e.g., the NM message transmitted in the step S1011) may be set to '011'.

The first switch 910, the second switch 920, the gateway 930, the first end node 911, the third end node 921, and the fourth end node 931 may receive the NM message of the second end node 912, and operate based on the information included in the received NM message. That is, the first switch 910, the second switch 920, the gateway 930, the first end node 911, the third end node 921, and the fourth end node 931 may operate in the same or similar manner as the first switch 910 described with reference to FIG. 12.

On the other hand, when the operation based on the generated event (e.g., the remote start event, the door open event) is completed, the operation mode of the communication nodes constituting the vehicle network may transition from the normal mode to the sleep mode (S1012). A transition method of the operation mode of the communication nodes may be performed as follows. The transition method of the operation mode performed by the first end node 911 will be described with reference to FIG. 13, but other communication nodes (e.g., the first switch 910, the second switch 920, the gateway 930, the second end node 912, the third end node 921, and the fourth end node 931) as well as the first end node 911 may also operate as follows.

Figure 13:
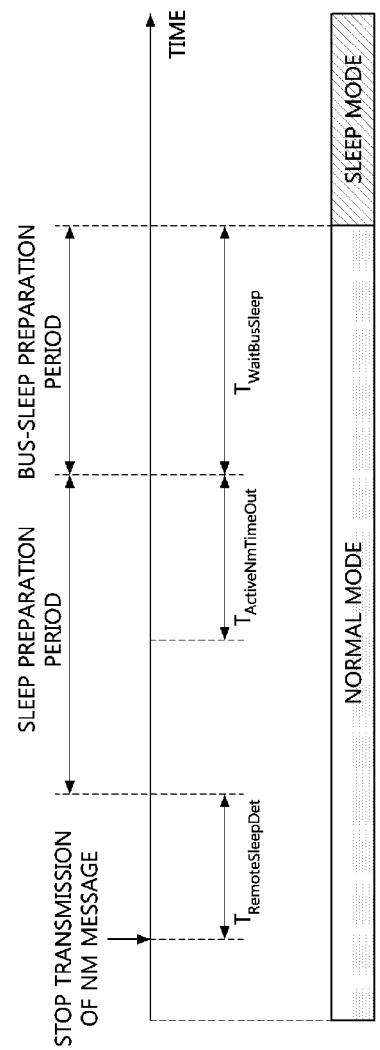
FIG. 13 is a timing diagram for explaining a third embodiment of an operation method of a communication node in the vehicle network shown in FIG. 9.

FIG. 13 is a timing diagram for explaining a third embodiment of an operation method of a communication node in the vehicle network shown in FIG. 9.

As shown in FIG. 13, the first end node 911 operating in the normal mode may stop the transmission of the NM message when the time period (i.e., the time period indicated by the NM message) has elapsed, and identify whether a NM message is received from another communication nodes during a time indicated by 'TRemoteSleepDet'. After the time indicated by 'TRemoteSleepDet', the first end node 911 may enter a sleep preparation period. For example, if an NM message of another communication node (e.g., NM message of the second end node 912 received via the step S1010 and step S1011) is received during the time indicated by 'TRemoteSleepDet', the first end node 911 may enter the sleep preparation period.

The first end node 911 may determine that all the communication nodes constituting the vehicle network are ready to operate in the sleep mode when the NM message of another communication node is not received during a time indicated by 'TActiveNmTimeOut' in the sleep preparation period. In this case, the first end node 911 may enter a bus-sleep preparation period. The first end node 911 may operate in a bus-sleep mode (e.g., the sleep mode) when the NM message of another communication node is not received during the time indicated by 'TWaitBusSleep' in the bus-sleep preparation period.

The processes disclosed herein, according to embodiments of the present disclosure, may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure. Therefore, it is to be understood that the disclosure is not limited to the disclosed embodiments, but, on the contrary, is intended to cover various modifications and equivalent arrangements included within the spirit and scope of the appended claims.

What is claimed is:

1. An operation method of a communication node in a vehicle network, the operation method comprising:
   performing a transition of an operation mode of the communication node from a sleep mode to a normal mode when a predetermined event is detected;
   transmitting a wake-up signal when the operation mode transitions from the sleep mode to the normal mode to other communication nodes;
   generating a network management (NM) message including information indicating a wake-up reason corresponding to the wake-up signal and information indicating a time duration during which the communication node operates in the normal mode; and
   transmitting the NM message to the other communication nodes periodically during the time duration,
   wherein the wake-up reason indicated by the NM message is used for determining operations performed by the other communication nodes,
   wherein the time duration is set according to a time required for the communication node to perform operations according to the wake-up reason, and
   wherein a transmission cycle of the NM message is longer than or equal to a time required for the communication nodes to complete a system booting procedure.

2. The operation method according to claim 1, the transmission cycle of the NM message is between 200 milliseconds and 500 milliseconds.

3. The operation method according to claim 1, wherein the NM message further includes information indicating an operation status of the communication node, the operation status indicates at least one of a wake-up method and the operation mode of the communication node, the wake-up method indicates an active wake-up or a passive wake-up, and the operation mode indicates the sleep mode or the normal mode.

4. The operation method according to claim 1, wherein the NM message includes a first field indicating source information, a second field indicating network status information, and a third field indicating wake-up related information.

5. The operation method according to claim 4, wherein the third field includes a first sub-field indicating whether to set the time duration, a second sub-field indicating a unit of the time duration, a third sub-field indicating the time duration, a fourth sub-field indicating an operation status of the communication node, and a fifth sub-field indicating the wake-up reason corresponding to the wake-up signal.

6. The operation method according to claim 1, wherein a NM message most recently transmitted from the communication node further includes information indicating that the communication node is transitioning to the sleep mode.

7. The operation method according to claim 1, wherein the NM message is transmitted in a broadcast manner in the vehicle network.

8. An operation method of a first communication node in a vehicle network, the operation method comprising:
   receiving a wake-up signal from a second communication node included in the vehicle network;
   performing a transition of an operation mode of the first communication node from a sleep mode to a normal mode when the wake-up signal is received;
   receiving a network management (NM) message including information indicating a wake-up reason corresponding to the wake-up signal from the second communication node and information indicating a time duration during which the second communication node operates in the normal mode;
   determining whether the wake-up reason is related to an operation performed by the first communication node; and
   operating the first communication node based on information included in the NM message, wherein the NM message is transmitted from the second communication node periodically during the time duration,
   wherein the time duration is set according to a time required for the second communication node to perform operations according to the wake-up reason, and
   wherein a transmission cycle of the NM message is longer than or equal to a time required for the communication nodes to complete a system booting procedure.

9. The operation method according to claim 8, wherein, when the first communication node performs an operation according to the wake-up reason, the first communication node operates in the normal mode during the time duration indicated by the NM message.

10. The operation method according to claim 9, wherein the NM message is periodically transmitted from the first communication node during the time duration, and the transmission cycle of the NM message is between 200 milliseconds and 500 milliseconds.

11. The operation method according to claim 8, wherein, when the first communication node does not perform an operation according to the wake-up reason, the operation mode of the first communication node transitions from the normal mode to the sleep mode.

12. The operation method according to claim 8, wherein the NM message includes a first field indicating source information, a second field indicating network status information, and a third field indicating wake-up related information.

13. The operation method according to claim 12, wherein the third field includes a first sub-field indicating whether to set the time duration, a second sub-field indicating a unit of the time duration, a third sub-field indicating the time duration, a fourth sub-field indicating an operation status of the communication node, and a fifth sub-field indicating the wake-up reason corresponding to the wake-up signal.

14. A communication node in a vehicle network, the communication node comprising a processor and a memory storing at least one instruction executed by the processor, which when executed cause the processor to:
   perform a transition of an operation mode of the communication node from a sleep mode to a normal mode when a predetermined event is detected;
   transmit a wake-up signal when the operation mode transitions from the sleep mode to the normal mode to other communication nodes;
   generate a network management (NM) message including information indicating a wake-up reason corresponding to the wake-up signal and information indicating a time duration during which the communication node operates in the normal mode; and
   transmit the NM message to the other communication nodes periodically during the time duration,
   wherein the wake-up reason indicated by the NM message is used for determining operations performed by the other communication nodes,
   wherein the time duration is set according to a time required for the communication node to perform operations according to the wake-up reason, and
   wherein a transmission cycle of the NM message is longer than or equal to a time required for the communication nodes to complete a system booting procedure.

15. The communication node according to claim 14, wherein the NM message further includes information indicating an operation status of the communication node, the operation status indicates at least one of a wake-up method and the operation mode of the communication node, the wake-up method indicates an active wake-up or a passive wake-up, and the operation mode indicates the sleep mode or the normal mode.

16. The communication node according to claim 14, wherein the NM message includes a first field indicating source information, a second field indicating network status information, and a third field indicating wake-up related information.

17. The communication node according to claim 16, wherein the third field includes a first sub-field indicating whether to set the time duration during which the first communication node operates in the normal mode, a second sub-field indicating a unit of the time duration, a third sub-field indicating the time duration, a fourth sub-field indicating an operation status of the communication node, and a fifth sub-field indicating the wake-up reason corresponding to the wake-up signal.

18. The communication node according to claim 14, wherein a NM message most recently transmitted from the communication node further includes information indicating that the communication node is transitioning to the sleep mode.

* * * * *